US012711048B2

(12) United States Patent
Zmigrod et al.

(10) Patent No.: US 12,711,048 B2
(45) Date of Patent: Aug. 18, 2026

(54) METHOD AND SYSTEM FOR AUTOMATING SOFTWARE DEVELOPMENT LIFECYCLES

(71) Applicant: JPMorgan Chase Bank, N.A., New York, NY (US)

(72) Inventors: Ran Zmigrod, Cambridge (GB); Vali Tawosi, London (GB); Nacho Navarro, Storrs, CT (US); Rares Dolga, London (GB); Salwa Husam Alamir, Bournemouth (GB); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 282 days.

(21) Appl. No.: 18/675,592

(22) Filed: May 28, 2024

(65) Prior Publication Data

US 2024/0411674 A1 Dec. 12, 2024

Related U.S. Application Data

(60) Provisional application No. 63/472,460, filed on Jun. 12, 2023.

(51) Int. Cl.
*G06F 11/3668* (2025.01)
*G06F 8/35* (2018.01)

(52) U.S. Cl.
CPC ............ *G06F 11/3688* (2013.01); *G06F 8/35* (2013.01); *G06F 11/3684* (2013.01)

(58) Field of Classification Search
None
See application file for complete search history.

(56) References Cited

U.S. PATENT DOCUMENTS 6,810,392 B1 * 10/2004 Piggott ..................... G06F 8/30 704/8
7,228,524 B2 * 6/2007 Bailey ................. G06F 11/3696 717/124

(Continued)

OTHER PUBLICATIONS

Angel, "Conceptual Mappings of Conventional Software and Machine Learning-based Applications Development", 2022, IEEE (Year: 2022).*

(Continued)

*Primary Examiner* — Hossain M Morshed
(74) *Attorney, Agent, or Firm* — GREENBLUM & BERNSTEIN, P.L.C.

(57) ABSTRACT

A method for automating a software development lifecycle by using artificial intelligence is disclosed. The method includes receiving a request to generate software components, the request including requirements in a natural language format; determining, by using a first model, tasks to generate the requested software components based on the request, each of the tasks including a sequence of subtasks, an acceptance criterion, and a predicted effort level; generating, by using a second model, sets of software code based on the tasks, the sets of software code corresponding to the requested software components; generating, by using a third model, unit tests for each of the sets of software code; initiating the unit tests for each of the sets of software code; and releasing, by using a fourth model, the sets of software code based on a result of the corresponding unit tests.

20 Claims, 5 Drawing Sheets

(56) References Cited

U.S. PATENT DOCUMENTS

| | | | | |
|---|---|---|---|---|
| 2022/0244938 | A1* | 8/2022 | Alamir | G06N 5/022 |
| 2022/0391803 | A1* | 12/2022 | Alamir | G06N 20/00 |
| 2024/0411674 | A1* | 12/2024 | Zmigrod | G06F 11/3684 |
| 2025/0355633 | A1* | 11/2025 | Srinivasan | G06F 8/30 |

OTHER PUBLICATIONS

Sorte, "Use of Artificial Intelligence in Software Development Life Cycle: A state of the Art Review", 2015, International Journal of Advanced Engineering and Global Technology (Year: 2015).*

* cited by examiner

METHOD AND SYSTEM FOR AUTOMATING SOFTWARE DEVELOPMENT LIFECYCLES

CROSS-REFERENCE TO RELATED APPLICATIONS

This application claims the benefit of U.S. Provisional Patent Application No. 63/472,460, filed Jun. 12, 2023, which is hereby incorporated by reference in its entirety.

BACKGROUND

1. Field of the Disclosure

This technology generally relates to methods and systems for managing software development, and more particularly to methods and systems for automating software development lifecycles by using a multi-agent system that leverages large language models to facilitate effective and efficient automation.

2. Background Information

Many business entities maintain extensive collections of software components that are relied upon to provide services for users. Often, a continuous development process such as, for example, a software development lifecycle is implemented to develop and manage each of the software components. Historically, implementations of conventional management techniques for the software development lifecycle have resulted in varying degrees of success with respect to enabling effective and efficient automation as well as acceleration of the software development lifecycle.

One drawback of the conventional management techniques is that in many instances, existing tools only focus on specific mechanisms of the software development lifecycle. As a result, the software development lifecycle may not be automated and accelerated from end-to-end. In addition, due to the narrow focus of the conventional management techniques, incorporating modern artificial intelligence such as, for example, large language models into the software development lifecycle may be challenging.

Therefore, there is a need for a multi-agent system that leverages large language models to facilitate effective and efficient automation of software development lifecycles.

SUMMARY

The present disclosure, through one or more of its various aspects, embodiments, and/or specific features or sub-components, provides, inter alia, various systems, servers, devices, methods, media, programs, and platforms for automating software development lifecycles by using a multi-agent system that leverages large language models to facilitate effective and efficient automation.

According to an aspect of the present disclosure, a method for automating a software development lifecycle by using artificial intelligence is disclosed. The method is implemented by at least one processor. The method may include receiving a request to generate at least one software component, the request may include at least one requirement in a natural language format; determining, by using a first model, at least one task based on the request, each of the at least one task may include a sequence of subtasks, an acceptance criterion, and a predicted effort level; generating, by using a second model, at least one set of software code based on the at least one task, the at least one set of software code may correspond to the requested at least one software component; generating, by using a third model, at least one unit test for each of the at least one set of software code; initiating the at least one unit test for each of the at least one set of software code; and releasing, by using a fourth model, the at least one set of software code based on a result of the corresponding at least one unit test.

In accordance with an exemplary embodiment, the first model, the second model, the third model, and the fourth model may correspond to a plurality of decision-making agents that interact in a shared computing environment of a multi-agent system, the multi-agent system may include a predetermined choreography of the plurality of decision-making agents.

In accordance with an exemplary embodiment, each of the first model, the second model, the third model, and the fourth model may relate to at least one from among a large language model, a deep learning model, a natural language processing model, a machine learning model, a mathematical model, a process model, and a data model.

In accordance with an exemplary embodiment, to determine the at least one task, the method may further include extracting, by using the first model, the at least one requirement from natural language data in the request; defining, by using the first model, a plan to generate each of the at least one software component based on the extracted at least one requirement; and determining, by using the first model, each of the at least one task based on the defined plan.

In accordance with an exemplary embodiment, to generate the at least one set of software code, the method may further include determining, by using the second model, that the at least one set of software code has been previously generated based on information aggregated from at least one other model; updating, by using the second model, the previously generated at least one set of software code based on the at least one task; and resolving, by using the second model, at least one software error that resulted from the updating.

In accordance with an exemplary embodiment, each of the at least one unit test may include a software testing component and a software validating component that enable examination of an individual unit of software code, the individual unit of software code may relate to a set of computer program modules that includes control data, a usage procedure, and an operating procedure.

In accordance with an exemplary embodiment, each of the at least one unit test may be initiated based on a predetermined guideline that governs software development, the predetermined guideline may include at least one from among an operational guideline, a business guideline, and a regulatory guideline.

In accordance with an exemplary embodiment, to release the at least one set of software code, the method may further include determining, by using the fourth model, at least one description for each of the at least one set of software code, the at least one description may include an explanation of a functionality in the natural language format; identifying, by using the fourth model, at least one recommended software code for appending to the at least one set of software code; and generating at least one code summary that includes the at least one description and the at least one recommended software code.

In accordance with an exemplary embodiment, the method may further include aggregating information from each of the first model, the second model, the third model, and the fourth model; and monitoring at least one parameter of the at least one software component based on the aggregated information.

According to an aspect of the present disclosure, a computing device configured to implement an execution of a method for automating a software development lifecycle by using artificial intelligence is disclosed. The computing device including a processor; a memory; and a communication interface coupled to each of the processor and the memory, wherein the processor may be configured to receive a request to generate at least one software component, the request may include at least one requirement in a natural language format; determine, by using a first model, at least one task based on the request, each of the at least one task may include a sequence of subtasks, an acceptance criterion, and a predicted effort level; generate, by using a second model, at least one set of software code based on the at least one task, the at least one set of software code may correspond to the requested at least one software component; generate, by using a third model, at least one unit test for each of the at least one set of software code; initiate the at least one unit test for each of the at least one set of software code; and release, by using a fourth model, the at least one set of software code based on a result of the corresponding at least one unit test.

In accordance with an exemplary embodiment, the first model, the second model, the third model, and the fourth model may correspond to a plurality of decision-making agents that interact in a shared computing environment of a multi-agent system, the multi-agent system may include a predetermined choreography of the plurality of decision-making agents.

In accordance with an exemplary embodiment, each of the first model, the second model, the third model, and the fourth model may relate to at least one from among a large language model, a deep learning model, a natural language processing model, a machine learning model, a mathematical model, a process model, and a data model.

In accordance with an exemplary embodiment, to determine the at least one task, the processor may be further configured to extract, by using the first model, the at least one requirement from natural language data in the request; define, by using the first model, a plan to generate each of the at least one software component based on the extracted at least one requirement; and determine, by using the first model, each of the at least one task based on the defined plan.

In accordance with an exemplary embodiment, to generate the at least one set of software code, the processor may be further configured to determine, by using the second model, that the at least one set of software code has been previously generated based on information aggregated from at least one other model; update, by using the second model, the previously generated at least one set of software code based on the at least one task; and resolve, by using the second model, at least one software error that resulted from the updating.

In accordance with an exemplary embodiment, each of the at least one unit test may include a software testing component and a software validating component that enable examination of an individual unit of software code, the individual unit of software code may relate to a set of computer program modules that includes control data, a usage procedure, and an operating procedure.

In accordance with an exemplary embodiment, the processor may be further configured to initiate each of the at least one unit test based on a predetermined guideline that governs software development, the predetermined guideline may include at least one from among an operational guideline, a business guideline, and a regulatory guideline.

In accordance with an exemplary embodiment, to release the at least one set of software code, the processor may be further configured to determine, by using the fourth model, at least one description for each of the at least one set of software code, the at least one description may include an explanation of a functionality in the natural language format; identify, by using the fourth model, at least one recommended software code for appending to the at least one set of software code; and generate at least one code summary that includes the at least one description and the at least one recommended software code.

In accordance with an exemplary embodiment, the processor may be further configured to aggregate information from each of the first model, the second model, the third model, and the fourth model; and monitor at least one parameter of the at least one software component based on the aggregated information.

According to an aspect of the present disclosure, a non-transitory computer readable storage medium storing instructions for automating a software development lifecycle by using artificial intelligence is disclosed. The storage medium including executable code which, when executed by a processor, may cause the processor to receive a request to generate at least one software component, the request may include at least one requirement in a natural language format; determine, by using a first model, at least one task based on the request, each of the at least one task may include a sequence of subtasks, an acceptance criterion, and a predicted effort level; generate, by using a second model, at least one set of software code based on the at least one task, the at least one set of software code may correspond to the requested at least one software component; generate, by using a third model, at least one unit test for each of the at least one set of software code; initiate the at least one unit test for each of the at least one set of software code; and release, by using a fourth model, the at least one set of software code based on a result of the corresponding at least one unit test.

In accordance with an exemplary embodiment, the first model, the second model, the third model, and the fourth model may correspond to a plurality of decision-making agents that interact in a shared computing environment of a multi-agent system, the multi-agent system may include a predetermined choreography of the plurality of decision-making agents.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
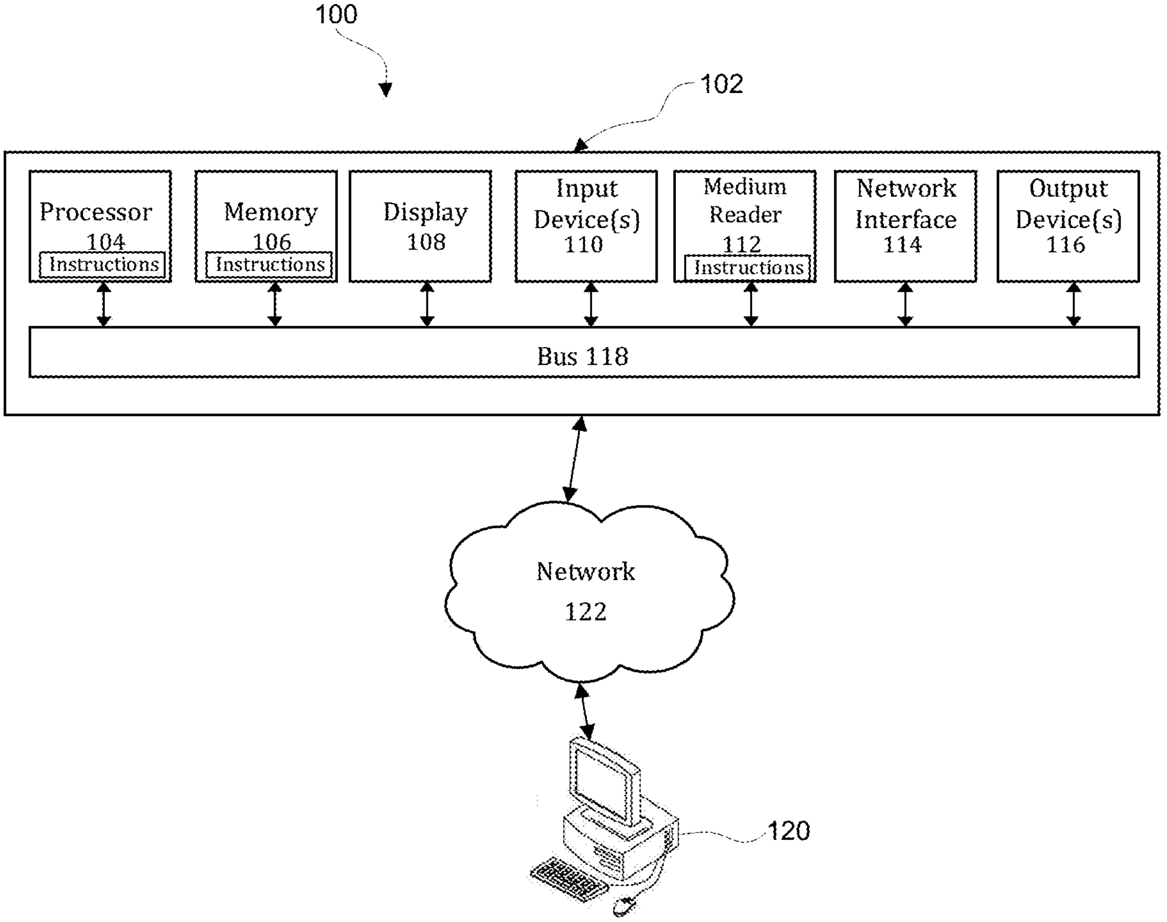
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automating software development lifecycles by using a multi-agent system that leverages large language models to facilitate effective and efficient automation.

Figure 2:
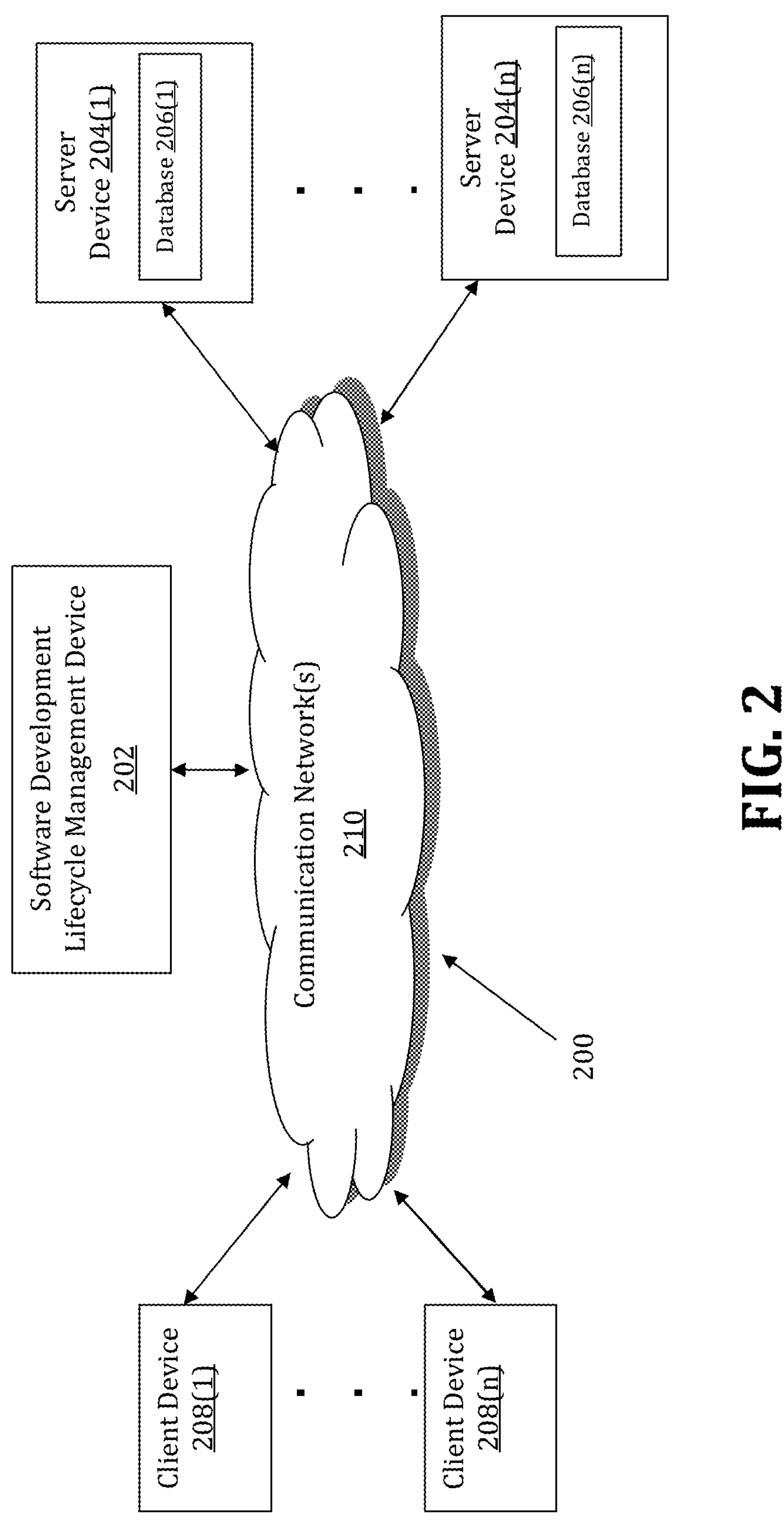
FIG. 2 illustrates an exemplary diagram of a network environment.

Referring to FIG. 2, a schematic of an exemplary network environment 200 for implementing a method for automating software development lifecycles by using a multi-agent system that leverages large language models to facilitate effective and efficient automation is illustrated. In an exemplary embodiment, the method is executable on any networked computer platform, such as, for example, a personal computer (PC).

The method for automating software development lifecycles by using a multi-agent system that leverages large language models to facilitate effective and efficient automation may be implemented by a Software Development Lifecycle Management (SDLCM) device 202. The SDLCM device 202 may be the same or similar to the computer system 102 as described with respect to FIG. 1. The SDLCM device 202 may store one or more applications that can include executable instructions that, when executed by the SDLCM device 202, cause the SDLCM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SDLCM device 202 itself, may be located in virtual server(s) running in a cloud-based computing environment rather than being tied to one or more specific physical network computing devices. Also, the application(s) may be running in one or more virtual machines (VMs) executing on the SDLCM device 202. Additionally, in one or more embodiments of this technology, virtual machine(s) running on the SDLCM device 202 may be managed or supervised by a hypervisor.

In the network environment 200 of FIG. 2, the SDLCM device 202 is coupled to a plurality of server devices 204(1)-204(n) that hosts a plurality of databases 206(1)-206(n), and also to a plurality of client devices 208(1)-208(n) via communication network(s) 210. A communication interface of the SDLCM device 202, such as the network interface 114 of the computer system 102 of FIG. 1, operatively couples and communicates between the SDLCM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SDLCM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SDLCM devices that efficiently implement a method for automating software development life-cycles by using a multi-agent system that leverages large language models to facilitate effective and efficient automation.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SDLCM device 202 may be a standalone device or integrated with one or more other devices or apparatuses, such as one or more of the server devices 204(1)-204(n), for example. In one particular example, the SDLCM device 202 may include or be hosted by one of the server devices 204(1)-204(n), and other arrangements are also possible. Moreover, one or more of the devices of the SDLCM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SDLCM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to requests, software components, requirements, natural language data, large language models, machine learning models, tasks, subtasks, acceptance criteria, predicted effort levels, software codes, unit tests, and code reviews.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SDLCM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SDLCM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SDLCM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SDLCM device 202, the server devices 204(1)-204(n), or the client devices 208(1)-208(n), for example, may be configured to operate as virtual instances on the same physical machine. In other words, one or more of the SDLCM device 202, the server devices 204(1)-204(n), or the client devices 208(1)-208(n) may operate on the same physical device rather than as separate devices communicating through communication network(s) 210. Additionally, there may be more or fewer SDLCM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
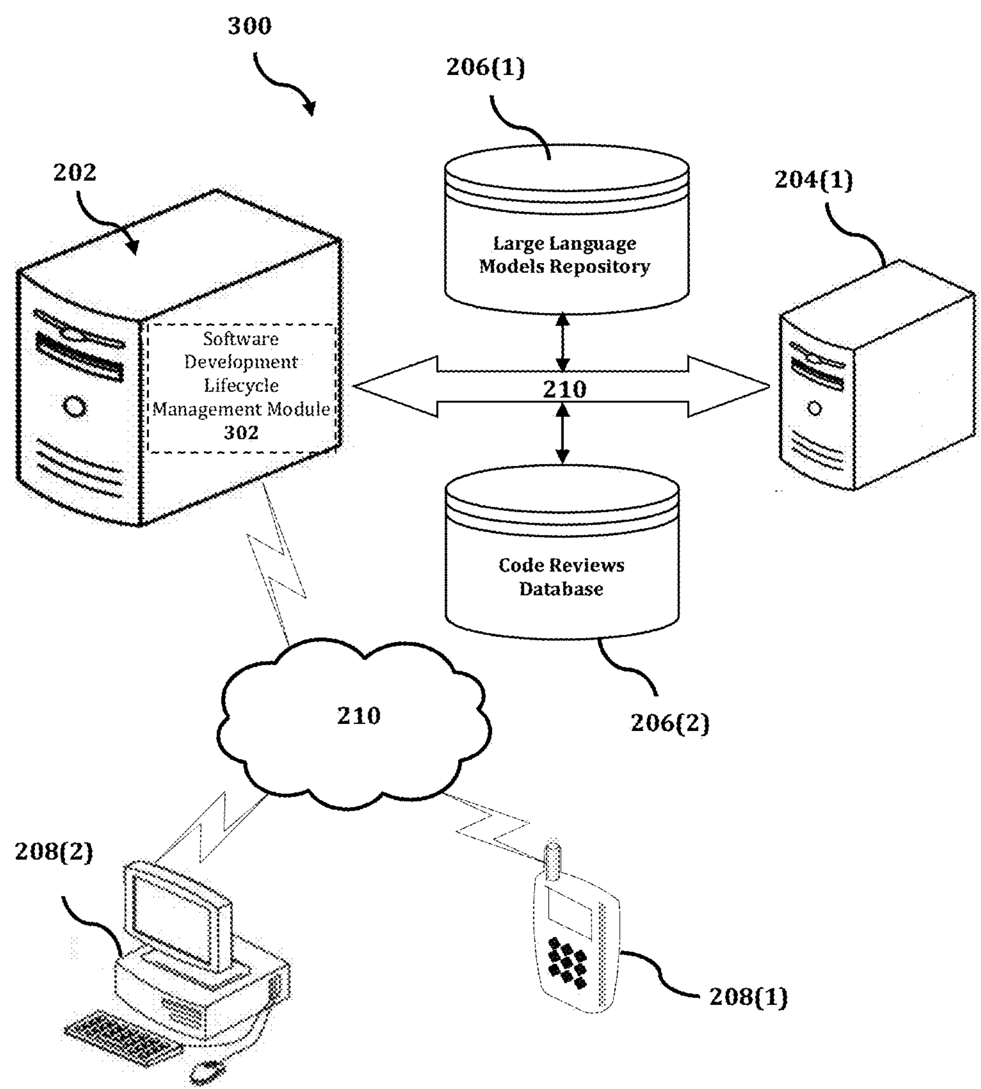
FIG. 3 shows an exemplary system for implementing a method for automating software development lifecycles by using a multi-agent system that leverages large language models to facilitate effective and efficient automation.

The SDLCM device 202 is described and shown in FIG. 3 as including a software development lifecycle management module 302, although it may include other rules, policies, modules, databases, or applications, for example. As will be described below, the software development lifecycle management module 302 is configured to implement a method for automating software development lifecycles by using a multi-agent system that leverages large language models to facilitate effective and efficient automation.

An exemplary process 300 for implementing a mechanism for automating software development lifecycles by using a multi-agent system that leverages large language models to facilitate effective and efficient automation by utilizing the network environment of FIG. 2 is shown as being executed in FIG. 3. Specifically, a first client device 208(1) and a second client device 208(2) are illustrated as being in communication with SDLCM device 202. In this regard, the first client device 208(1) and the second client device 208(2) may be "clients" of the SDLCM device 202 and are described herein as such. Nevertheless, it is to be known and understood that the first client device 208(1) and/or the second client device 208(2) need not necessarily be "clients" of the SDLCM device 202, or any entity described in association therewith herein. Any additional or alternative relationship may exist between either or both of the first client device 208(1) and the second client device 208(2) and the SDLCM device 202, or no relationship may exist.

Further, SDLCM device 202 is illustrated as being able to access a large language models repository 206(1) and a code reviews database 206(2). The software development lifecycle management module 302 may be configured to access these databases for implementing a method for automating software development lifecycles by using a multi-agent system that leverages large language models to facilitate effective and efficient automation.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SDLCM device 202 via broadband or cellular communication. Of course, these embodiments are merely exemplary and are not limiting or exhaustive.

Upon being started, the software development lifecycle management module 302 executes a process for automating software development lifecycles by using a multi-agent system that leverages large language models to facilitate effective and efficient automation. An exemplary process for automating software development lifecycles by using a multi-agent system that leverages large language models to facilitate effective and efficient automation is generally indicated at flowchart 400 in FIG. 4.

Figure 4:
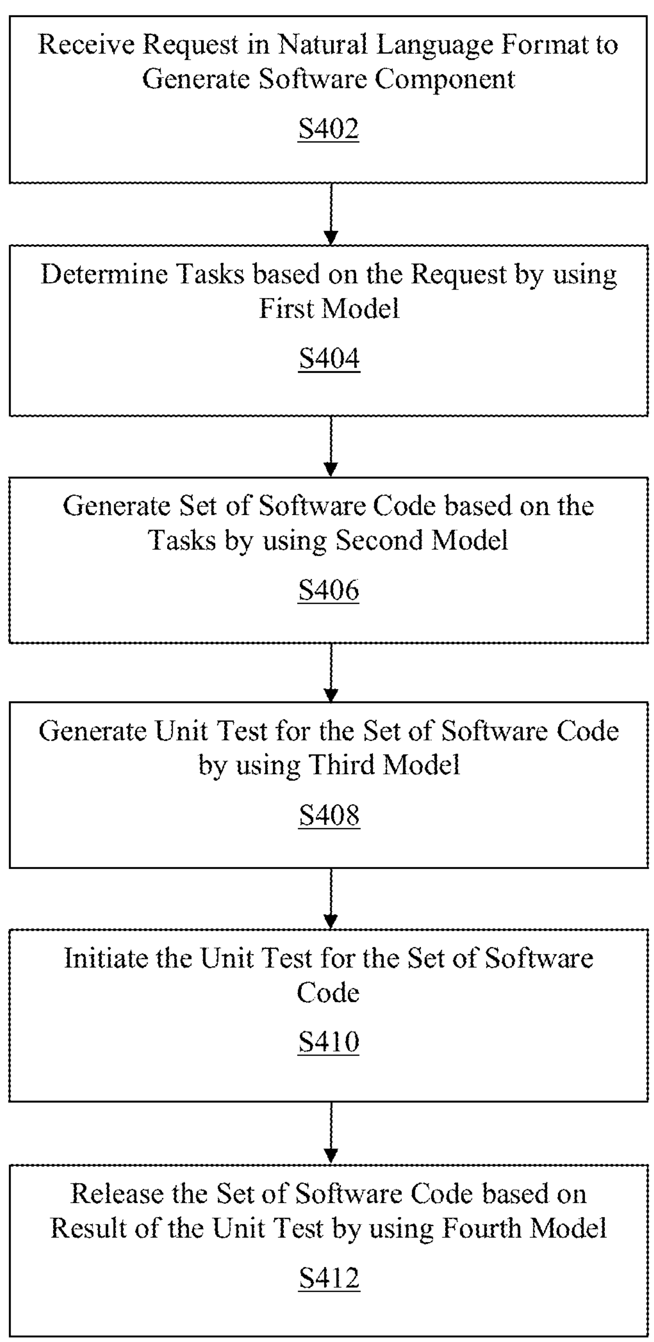
FIG. 4 is a flowchart of an exemplary process for implementing a method for automating software development lifecycles by using a multi-agent system that leverages large language models to facilitate effective and efficient automation.

In the process 400 of FIG. 4, at step S402, requests to generate software components such as, for example, applications may be received. The requests may include requirements in a natural language format. In an exemplary embodiment, the requests may include brief requests such as, for example, user stories that are written in the natural language format from a user perspective. The user stories may be a part of larger initiatives such as, for example, epics. The user stories may relate to simple narratives that are written from the perspective of an end user.

In another exemplary embodiment, the requests may be received by a multi-agent system that works to automate the software development lifecycle. The multi-agent system may leverage a collection of artificial intelligence models such as, for example, large language models to tackle specific processes of the software development lifecycle. Each of the artificial intelligence models may communicate and interact with each other in the multi-agent system to enable effective and efficient automation as well as acceleration of the software development lifecycle. Consistent with present disclosures, each of the artificial intelligence models may correspond to an agent in the multi-agent system.

In another exemplary embodiment, the artificial intelligence models in the present disclosure may be individually represented as a first model, a second model, a third model, and a fourth model. Each of the first model, the second model, the third model, and the fourth model may be usable to represent a specific step in the software development lifecycle. As will be appreciated by a person of ordinary skill in the art, the representation of steps in the software development lifecycle may include any number of models in addition to the four models exemplified in the present disclosure. For example, the software development lifecycle may be roughly categorized into eight components: plan, code, build, test, release, deploy, operate, and monitor. As a result, eight total models may be usable to facilitate automation of the software development lifecycle, i.e., one for each of the eight components.

In another exemplary embodiment, the first model, the second model, the third model, and the fourth model may correspond to a plurality of decision-making agents that interact in a shared computing environment of a multi-agent system. The multi-agent system may include a predetermined choreography of the plurality of decision-making agents.

In another exemplary embodiment, each of the first model, the second model, the third model, and the fourth model may relate to at least one from among a large language model, a deep learning model, a natural language processing model, a machine learning model, a mathematical model, a process model, and a data model. The models may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori Algorithm analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the large language model may relate to a trained deep-learning model that understands and generates text in a human-like fashion. The large language model may recognize, summarize, translate, predict, and generate various types of text as well as content based on knowledge gained from massive data sets. In another exemplary embodiment, the large language model may correspond to a language model that consists of a neural network with many parameters such as, for example, weights. The language model may be trained on large quantities of unlabeled and labeled text by using self-supervised learning or semi-supervised learning. The trained language model may be usable to capture syntax and semantics of human language.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S404, tasks may be determined based on the requests. The tasks may be automatically determined by using a first model. In an exemplary embodiment, the first model may be usable to plan the tasks that should be taken to satisfy the requests. The first model may receive as input the requirements from the requests to generate plans that break down an identified problem into feasible steps.

In another exemplary embodiment, the tasks may be a part of a user story that functions as a single unit of work that needs to be completed. Each of the tasks may include a sequence of subtasks that are required to complete the tasks, an acceptance criterion, and a predicted effort level. For example, the first model may be usable to generate acceptance criteria for the tasks and estimate the level of effort required to complete the tasks.

At step S406, sets of software code may be generated based on the determined tasks. The sets of software code may be automatically generated by using a second model. The sets of software code may correspond to the requested software components. In an exemplary embodiment, the second model may create new code, update existing code, and fix bugs in the code sets. The second model may be implemented to broadly facilitate the software code generation process. The second model may interact with the other models to understand which sets of software code exist and which sets of software code must be produced in response to the requests.

In another exemplary embodiment, to generate the sets of software code, the process may include automatically determining that the set of software code has been previously generated. The determination may be made by using the second model based on information that is aggregated from other models in the multi-agent system. The second model may include broad functionalities that enable interactions with the other models to understand what code exists and what code requires generation.

Then, the previously generated sets of software code may be automatically updated based on the tasks. The second model may be usable to update the previously generated sets of software code. The previously generated sets of software code may be updated to satisfy requirements in the requests. The updating process may include the setting of application parameters according to the requirements as well as the incorporation of functionalities according to the requirements. For example, the second model may update the previously generated sets of software code with a desired functionality based on the request to generate a desired software component. Consistent with present disclosures, updating previously generated sets of software code instead of generating new sets for each of the requests may improve resource efficiency by reducing duplication of effort.

Further, software errors that resulted from the updating may be identified and resolved. The software errors may be automatically identified from the updated sets of software code and automatically resolved by using the second model. The software errors may relate to errors in the coding such as, for example, incorrectly coded functionalities as well as structural errors such as, for example, incorrectly mapped dependencies. A level of incorrectness may be determined for each of the software errors based on a degree of impact. For example, an incorrectly coded functionality may correspond to a high level of incorrectness while an inefficiently coded functionality may correspond to a low level of incorrectness.

At step S408, unit tests may be generated for each of the sets of software code. The unit tests may be automatically generated by using a third model. In an exemplary embodiment, the third model may generate unit tests for newly generated sets of software code as well as previously generated sets of software code. The unit tests may correspond to software testing and validating components that examine individual units of software code. The individual units of software code may relate to sets of one or more computer program modules together with associated control data, usage procedures, and operating procedures. The unit tests may be usable to determine whether the sets of software code are fit for use.

At step S410, the unit tests may be initiated for each of the sets of software code. In an exemplary embodiment, the unit tests may be automatically initiated based on a predetermined guideline. The predetermined guideline may include at least one from among an operational guideline, a business guideline, and a regulatory guideline that governs software development.

In another exemplary embodiment, the operational guideline may define operating parameters for the developed software components. The operational guideline may specify acceptable performance for various functionalities of the software components. For example, the operational guideline may include operational thresholds such as latency thresholds that affect user experience.

In another exemplary embodiment, the business guideline may define business parameters for the developed software components. The business guideline may specify a range of acceptable costs that are associated with the various functionalities of the software components. For example, the business guideline may include pricing thresholds such as server cost thresholds that affect the line of business.

In another exemplary embodiment, the regulatory guideline may define regulatory parameters for the developed software components. The regulatory guideline may specify regulatory requirements for various functionalities of the software components. For example, the regulatory guideline may include regulatory thresholds such as period of time thresholds for persisting customer data.

At step S412, the sets of software code may be released based on a result of the corresponding unit tests. The sets of software code may be automatically released by using a fourth model. In an exemplary embodiment, the fourth model may be aimed at the release aspect of the software development lifecycle. The fourth model may be usable to provide code summaries for what the set of software code does and whether additional software codes should be added.

In another exemplary embodiment, a process related to the releasing of the sets of software code may include determining descriptions for each of the sets of software code. The descriptions may include explanations of various functionalities in a natural language format. The determination may be made automatically by using the fourth model. For example, the fourth model may be usable to analyze a set of software code to generate a description in a natural language format that describes what the set of software code does.

Then, recommended software codes may be identified for appending to the sets of software code. The recommended software codes may relate to supplemental code that may be added to the sets of software code to improve functionality and/or improve performance. The identification may be made automatically by using the fourth model. For example, the fourth model may be usable to identify recommended software codes that improves processing efficiency of the sets of software code when appended to the sets of software code.

Finally, code summaries that include the description and the recommended software code may be generated. The code summaries may be generated for each of the sets of software codes. The code summaries may provide information for what the code does and whether additional code should be added. The code summaries may include a code review section that provides information for each code segment in the sets of software code. The code summaries may enable comparisons of the code segments with similar code segments that have previously been validated. Consistent with present disclosures, the code summaries may be accessible via an application programming interface as well as displayable via a graphical user interface.

In another exemplary embodiment, information from each of the first model, the second model, the third model, and the fourth model may be aggregated. The information may be aggregated from the models as well as intercepted from a corresponding data stream. The information may include various parameters of the software components and the corresponding operating environment of the software components. Then, the various parameters of the software components may be monitored based on the aggregated information. For example, information may be collected from various models in the multi-agent system to track progression of the software component throughout the software development lifecycle.

In another exemplary embodiment, the monitoring of the various parameters of the software components may facilitate implementation of a software development methodology such as, for example, a DevOps methodology. The software development methodology may relate to a set of practices, tools, and philosophies that automate and integrate the processes between software development and supporting operation teams. The software development methodology may combine software development practices with deployment and operation concepts. The software development methodology may be implemented as a way to improve and shorten the software development lifecycle.

In another exemplary embodiment, feedback data may be aggregated for each of the first model, the second model, the third model, and the fourth model. The feedback data may include information that relates to corresponding outputs of the models. The information may include performance information, accuracy information, and validated information that relates to the corresponding outputs of the models. Then, the feedback data may be usable to train the models as well as assess performance of the models. For example, the aggregated feedback data may be inputted back into the corresponding models to further refine functionalities and predictive capabilities of the models.

Figure 5:
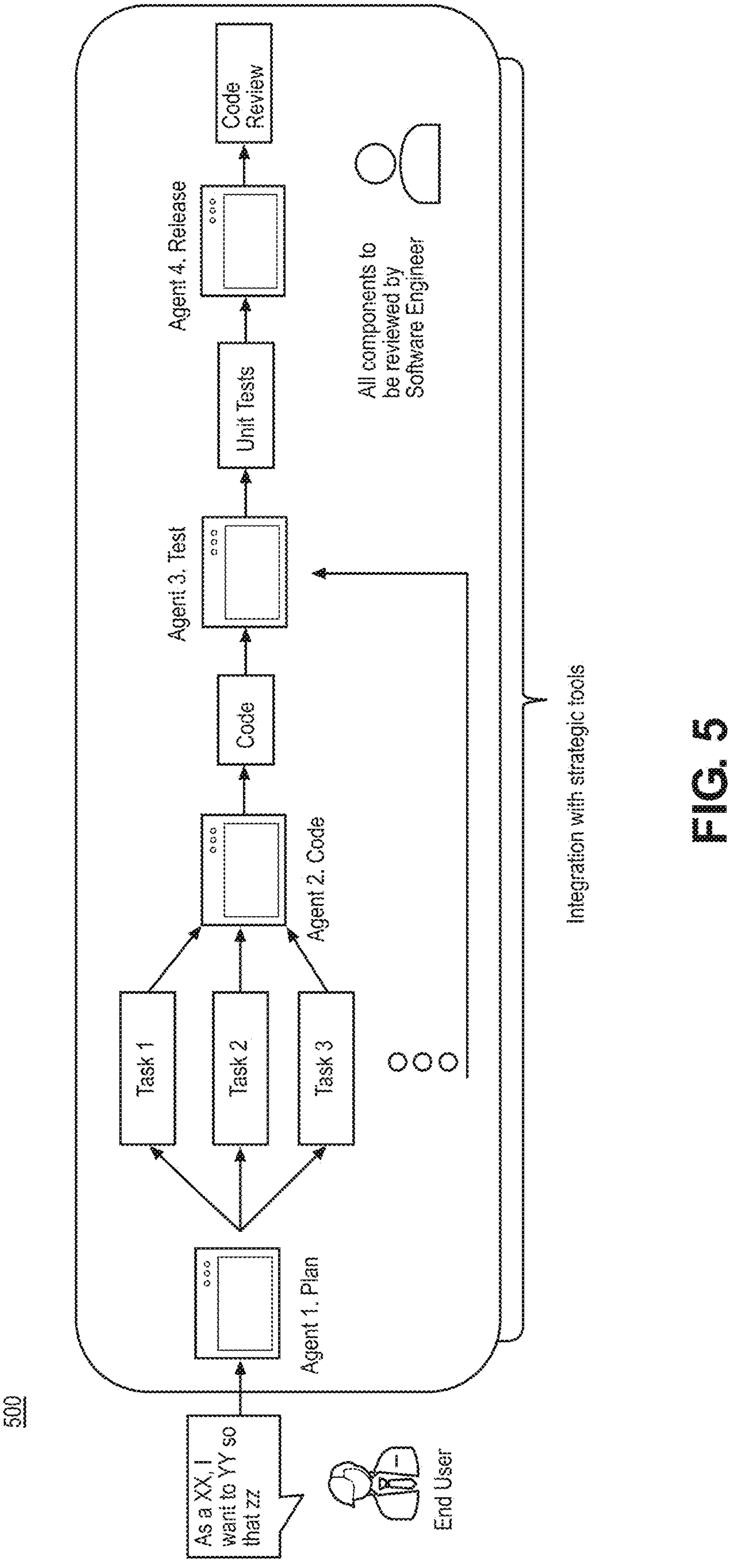
FIG. 5 is a flow diagram of an exemplary process for implementing a method for automating software development lifecycles by using a multi-agent system that leverages large language models to facilitate effective and efficient automation.

FIG. 5 is a flow diagram 500 of an exemplary process for implementing a method for automating software development lifecycles by using a multi-agent system that leverages large language models to facilitate effective and efficient automation. In FIG. 5, an architecture that uses large language model agents to automatically generate applications may be provided. The architecture may leverage the large language model agents to accelerate and automate the software development lifecycle from end-to-end.

As illustrated in FIG. 5, a multi-agent system may be provided that utilizes the large language models to enable acceleration and automation of many aspects of the software development lifecycle. The pipeline for the software development lifecycle may be roughly categorized into eight components: plan, code, build, test, release, deploy, operate, and monitor. Each of the agents in the multi-agent system may be implemented by using a combination of large language models, tools, and other artificial intelligence techniques.

As an exemplary embodiment, FIG. 5 illustrates an overall interaction between four agents. The four agents may include a planning agent, a coding agent, a testing agent, and a release agent. The planning agent may focus on planning the tasks that should be taken in the development of an application. The planning agent may be able to take an initial set of requirements and generate plans such as, for example, subtasks that break down a problem into feasible steps. Additionally, the planning agent may create acceptance criteria for tasks and estimate the level of effort required.

The coding agent may focus on generating code for the requested application. The coding agent may create new code, update existing code, and fix bugs/errors in the code. The coding agent may have broad capabilities and may interact with the other agents to understand which code sets exist and which code sets must be newly generated.

The testing agent may focus on generating unit tests for the code sets of the requested application. The testing agent may generate unit tests for newly generated code sets as well as for previously generated code sets. The testing agent may work closely with the coding agent to produce the necessary unit tests.

The releasing agent may be aimed at release aspects of the software development lifecycle for the requested application. Consistent with present disclosures, the releasing agent may provide code summaries for what the code set does and whether further codes should be added to the code set. The code summaries may include an automatically generated peer review that provides information on various sections of the code set.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, a platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

Accordingly, with this technology, an optimized process for automating software development lifecycles by using a multi-agent system that leverages large language models to facilitate effective and efficient automation is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automating a software development lifecycle by using artificial intelligence, the method being implemented by at least one processor, the method comprising:

receiving, by the at least one processor, a request to generate at least one software component, the request including at least one requirement in a natural language format;

determining, by the at least one processor using a first model, at least one task based on the request, each of the at least one task including a sequence of subtasks, an acceptance criterion, and a predicted effort level;

generating, by the at least one processor using a second model, at least one set of software code based on the at least one task, the at least one set of software code corresponding to the requested at least one software component;

generating, by the at least one processor using a third model, at least one unit test for each of the at least one set of software code;

initiating, by the at least one processor, the at least one unit test for each of the at least one set of software code; and releasing, by the at least one processor using a fourth model, the at least one set of software code based on a result of the corresponding at least one unit test.

2. The method of claim 1, wherein the first model, the second model, the third model, and the fourth model correspond to a plurality of decision-making agents that interact in a shared computing environment of a multi-agent system, the multi-agent system including a predetermined choreography of the plurality of decision-making agents.

3. The method of claim 1, wherein each of the first model, the second model, the third model, and the fourth model relates to at least one from among a large language model, a deep learning model, a natural language processing model, a machine learning model, a mathematical model, a process model, and a data model.

4. The method of claim 1, wherein the determining of the at least one task further comprises:

extracting, by the at least one processor using the first model, the at least one requirement from natural language data in the request;

defining, by the at least one processor using the first model, a plan to generate each of the at least one software component based on the extracted at least one requirement; and determining, by the at least one processor using the first model, each of the at least one task based on the defined plan.

5. The method of claim 1, wherein the generating of the at least one set of software code further comprises:

determining, by the at least one processor using the second model, that the at least one set of software code has been previously generated based on information aggregated from at least one other model;

updating, by the at least one processor using the second model, the previously generated at least one set of software code based on the at least one task; and resolving, by the at least one processor using the second model, at least one software error that resulted from the updating.

6. The method of claim 1, wherein each of the at least one unit test includes a software testing component and a software validating component that enable examination of an individual unit of software code, the individual unit of software code relating to a set of computer program modules that includes control data, a usage procedure, and an operating procedure.

7. The method of claim 1, wherein each of the at least one unit test is initiated based on a predetermined guideline that governs software development, the predetermined guideline including at least one from among an operational guideline, a business guideline, and a regulatory guideline.

8. The method of claim 1, wherein the releasing of the at least one set of software code further comprises:

determining, by the at least one processor using the fourth model, at least one description for each of the at least one set of software code, the at least one description including an explanation of a functionality in the natural language format;

identifying, by the at least one processor using the fourth model, at least one recommended software code for appending to the at least one set of software code; and generating, by the at least one processor, at least one code summary that includes the at least one description and the at least one recommended software code.

9. The method of claim 1, further comprising:

aggregating, by the at least one processor, information from each of the first model, the second model, the third model, and the fourth model; and monitoring, by the at least one processor, at least one parameter of the at least one software component based on the aggregated information.

10. A computing device configured to implement an execution of a method for automating a software development lifecycle by using artificial intelligence, the computing device comprising:

a processor;

a memory; and a communication interface coupled to each of the processor and the memory, wherein the processor is configured to:

receive a request to generate at least one software component, the request including at least one requirement in a natural language format;

determine, by using a first model, at least one task based on the request, each of the at least one task including a sequence of subtasks, an acceptance criterion, and a predicted effort level;

generate, by using a second model, at least one set of software code based on the at least one task, the at least one set of software code corresponding to the requested at least one software component;

generate, by using a third model, at least one unit test for each of the at least one set of software code;

initiate the at least one unit test for each of the at least one set of software code; and release, by using a fourth model, the at least one set of software code based on a result of the corresponding at least one unit test.

11. The computing device of claim 10, wherein the first model, the second model, the third model, and the fourth model correspond to a plurality of decision-making agents that interact in a shared computing environment of a multi-agent system, the multi-agent system including a predetermined choreography of the plurality of decision-making agents.

12. The computing device of claim 10, wherein each of the first model, the second model, the third model, and the fourth model relates to at least one from among a large language model, a deep learning model, a natural language processing model, a machine learning model, a mathematical model, a process model, and a data model.

13. The computing device of claim 10, wherein, to determine the at least one task, the processor is further configured to:

extract, by using the first model, the at least one requirement from natural language data in the request;

define, by using the first model, a plan to generate each of the at least one software component based on the extracted at least one requirement; and determine, by using the first model, each of the at least one task based on the defined plan.

14. The computing device of claim 10, wherein, to generate the at least one set of software code, the processor is further configured to:

determine, by using the second model, that the at least one set of software code has been previously generated based on information aggregated from at least one other model;

update, by using the second model, the previously generated at least one set of software code based on the at least one task; and resolve, by using the second model, at least one software error that resulted from the updating.

15. The computing device of claim 10, wherein each of the at least one unit test includes a software testing component and a software validating component that enable examination of an individual unit of software code, the individual unit of software code relating to a set of computer program modules that includes control data, a usage procedure, and an operating procedure.

16. The computing device of claim 10, wherein the processor is further configured to initiate each of the at least one unit test based on a predetermined guideline that governs software development, the predetermined guideline including at least one from among an operational guideline, a business guideline, and a regulatory guideline.

17. The computing device of claim 10, wherein, to release the at least one set of software code, the processor is further configured to:

determine, by using the fourth model, at least one description for each of the at least one set of software code, the at least one description including an explanation of a functionality in the natural language format;

identify, by using the fourth model, at least one recommended software code for appending to the at least one set of software code; and generate at least one code summary that includes the at least one description and the at least one recommended software code.

18. The computing device of claim 10, wherein the processor is further configured to:

aggregate information from each of the first model, the second model, the third model, and the fourth model; and monitor at least one parameter of the at least one software component based on the aggregated information.

19. A non-transitory computer readable storage medium storing instructions for automating a software development lifecycle by using artificial intelligence, the storage medium comprising executable code which, when executed by a processor, causes the processor to:

receive a request to generate at least one software component, the request including at least one requirement in a natural language format;

determine, by using a first model, at least one task based on the request, each of the at least one task including a sequence of subtasks, an acceptance criterion, and a predicted effort level;

generate, by using a second model, at least one set of software code based on the at least one task, the at least one set of software code corresponding to the requested at least one software component;

generate, by using a third model, at least one unit test for each of the at least one set of software code;

initiate the at least one unit test for each of the at least one set of software code; and release, by using a fourth model, the at least one set of software code based on a result of the corresponding at least one unit test.

20. The storage medium of claim 19, wherein the first model, the second model, the third model, and the fourth model correspond to a plurality of decision-making agents that interact in a shared computing environment of a multi-agent system, the multi-agent system including a predetermined choreography of the plurality of decision-making agents.

* * * * *